(12) United States Patent
Falik et al.

(10) Patent No.: US 9,152,205 B2
(45) Date of Patent: Oct. 6, 2015

(54) MECHANISM FOR FACILITATING FASTER SUSPEND/RESUME OPERATIONS IN COMPUTING SYSTEMS

(75) Inventors: Ohad Falik, Kfar Saba (IL); Eliezer Weissmann, Haifa (IL); Alon Naveh, Ramat Hasharon (IL); Michael Mishaeli, Zichron Yaakov (IL); Nadav Shulman, Tel Mond (IL); Robert E. Gough, Sherwood, OR (US); Erik C. Bjorge, Hillsboro, OR (US); Douglas R. Moran, Folsom, CA (US); Peter A. Dice, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 227 days.

(21) Appl. No.: 13/596,915

(22) Filed: Aug. 28, 2012

(65) Prior Publication Data

US 2014/0068302 A1 Mar. 6, 2014

(51) Int. Cl.
*G06F 1/32* (2006.01)
*G06F 9/44* (2006.01)

(52) U.S. Cl.
CPC ............ *G06F 1/3206* (2013.01); *G06F 9/4418* (2013.01)

(58) Field of Classification Search
CPC ....................................................... G06F 1/3203
USPC ......................................... 713/320, 323, 324
See application file for complete search history.

(56) References Cited

U.S. PATENT DOCUMENTS

| | | | |
|---|---|---|---|
| 2003/0101362 A1* | 5/2003 | Dia ............................... | 713/300 |
| 2009/0327553 A1* | 12/2009 | Fletcher ....................... | 710/262 |
| 2010/0064159 A1* | 3/2010 | Wu et al. ..................... | 713/323 |
| 2011/0078463 A1* | 3/2011 | Fleming et al. .............. | 713/300 |
| 2011/0231681 A1* | 9/2011 | Allarey et al. ................ | 713/310 |

\* cited by examiner

*Primary Examiner* — Vincent Tran
(74) *Attorney, Agent, or Firm* — Blakely, Sokoloff, Taylor & Zafman LLP (57) ABSTRACT

A mechanism is described for facilitating faster suspend/resume operations in computing systems according to one embodiment of the invention. A method of embodiments of the invention includes initiating an entrance process into a first sleep state in response to a sleep call at a computing system, transforming from the first sleep state to a second sleep state. The transforming may include preserving at least a portion of processor context at a local memory associated with one or more processor cores of a processor at the computing system. The method may further include entering the second sleep state.

28 Claims, 9 Drawing Sheets

MECHANISM FOR FACILITATING FASTER SUSPEND/RESUME OPERATIONS IN COMPUTING SYSTEMS

FIELD

Embodiments of the invention relate to computing systems. More particularly, embodiments of the invention relate to a mechanism for facilitating faster suspend/resume operations in computing systems.

BACKGROUND

Certain low power states referred to as S-states (e.g., S1, S2, S3, S4, etc.) are well-known in computer systems. One popular low power state is S3 that is often referred to as Standby, Sleep, and Suspend to Random Access Memory (RAM). Although S3 power state provides a relatively fast suspend and resume time over more conventional techniques (such as those relating to re-starting a computing device or suspend to disc), it still suffers for several latencies and delays, particularly with regard to the (re)initialization process that is part of the resume sequence. For example, the context of various devices (including that of a Central Processing Unit (CPU) cores) may be lost and to resume the computing system back to the same configuration as before the suspend operation may require (re)initialization of all of system elements that were powered off during suspension. Such process can make the resume operation in S3 power state, being executed from the Basic Input Output System (BIOS) flash, consume both time and energy.

BRIEF DESCRIPTION OF THE DRAWINGS

Embodiments of the invention are illustrated by way of example, and not by way of limitation, in the figures of the accompanying drawings in which like reference numerals refer to similar elements.

DETAILED DESCRIPTION

In the following description, numerous specific details are set forth. However, embodiments of the invention may be practiced without these specific details. In other instances, well-known circuits, structures and techniques have not been shown in details in order not to obscure the understanding of this description.

Embodiments of the invention provide a mechanism for facilitating faster suspend/resume operations in computing systems. In one embodiment, a novel S3 Plus state (also referred to as "S3P" or "S3p") is introduced and described where the full (architectural and micro-architectural) CPU context (also referred to as "processor context", "processor package", or "processor package c-state") is preserved at a local integrated memory (e.g., CPU integrated memory, including integrated random access memory (RAM), or to system dynamic RAM (DRAM), etc.) so that the preserved context may be recovered or restored directly from the local memory during an S3p-based resume process (without having to require the conventional S3-based rebuilding of the CPU context). In one embodiment, an integrated memory at the CPU is used for saving at least some of the information of the CPU context that is sensitive. In another embodiment, the integrated memory holds encryption and protection keys for information stored in DRAM. With this novel S3P technique, the resume operation starts directly from the local memory, such as the RAM, (as opposed to the conventional S3 technique of using a slow BIOS flash). Further, this novel technique allows for skipping over several conventional BIOS-related suspend/resume processes of the S3 state by simply having the CPU context preserved at the local memory, such as the RAM, and then restoring it (as opposed to rebuilt it by BIOS and OS flows) by triggering the resume process directly from the RAM (as opposed to from the BIOS flash). However, the use of the terms "S3P" or "S3p" or "S3 Plus" should not be read to limit embodiments of the invention to devices that carry that label in products or in literature external to this document.

It is contemplated that although for brevity, simplicity, and ease of understanding, this document focuses primarily on preserving and restoring CPU context, embodiments of the invention are not limited as such and that they are equally applicable to and workable with various contexts of any number and type of components and devices of a computing system, including any number and type of peripheral devices. Examples of power states include S0 (working), S1 (sleep), S2 (sleep), S3 (standby/sleep, suspend to RAM), S4 (hibernate), and S5 (off) as defined by the Advanced Configuration and Power Interface (ACPI) specification serving as an open standard for device configuration and power management by the operating system. Various ACPI specifications have been published including a revision 3.0b, dated Oct. 10, 2006, which is available for download.

Figure 1:
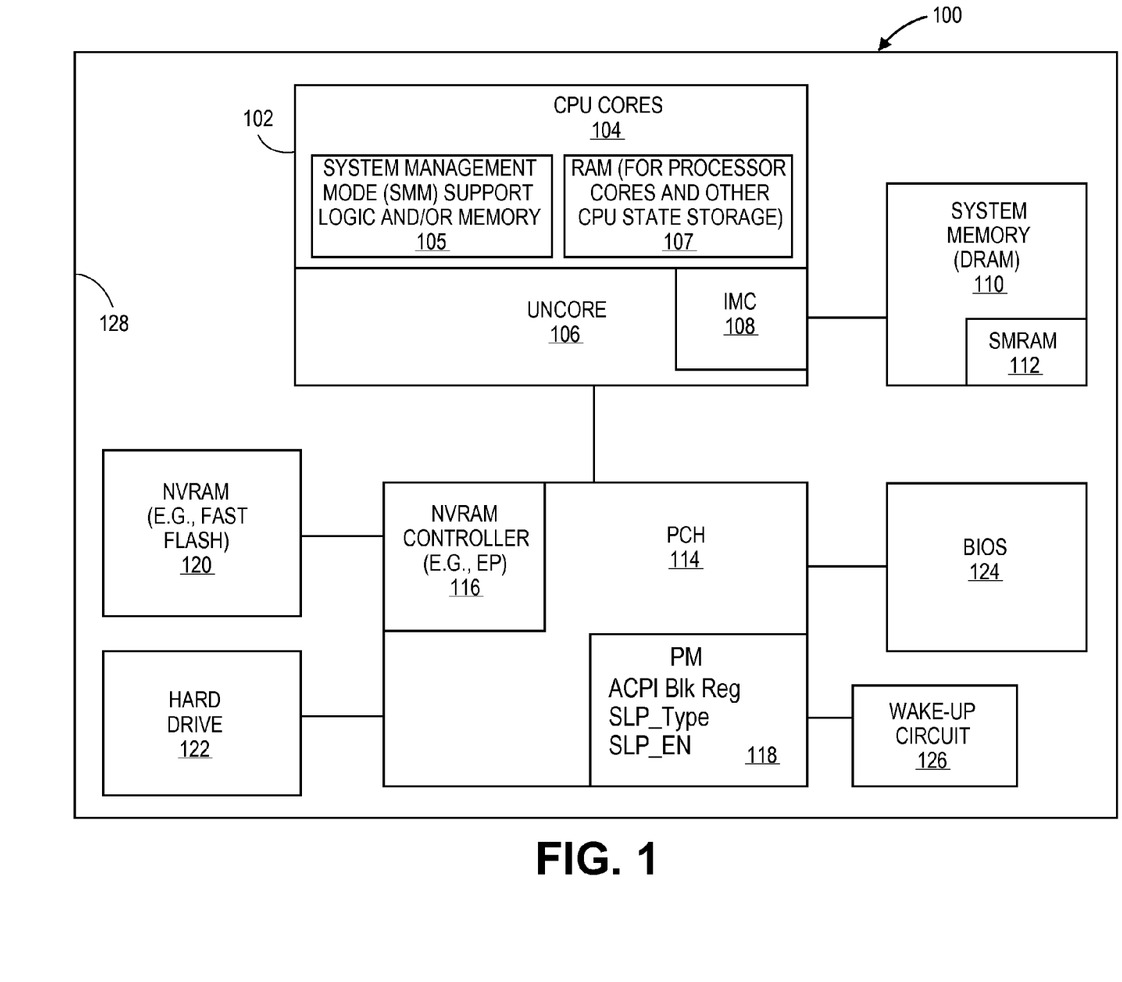
FIG. 1 illustrates a computing system suitable for implementing embodiments of the present disclosure according to one embodiment of the invention.

FIG. 1 illustrates a computing system 100 suitable for implementing embodiments of the present disclosure according to one embodiment of the invention. Computing system 100 includes a processor 102 coupled to a platform controller hub (PCH) 114 and a system memory (e.g., DRAM) 110. Processor 102 may include central processor unit (CPU) cores 104 and an uncore 106. The term uncore is not intended to have a restricted definition, but is a general term to refer to parts of the processor with various interface and control circuits that are not part of the core. Uncore 106 includes an integrated memory controller (IMC) 108 to control system memory 110. System memory 110 may include a portion 112 for holding the space used by system management mode (SMM) support logic and/or memory 105 to save its context (system management RAM (SMRAM)). SMM support logic and/or memory 105 may be part of CPU cores 104 may refer to an operating mode in which normal execution (including the operating system) may be suspended and special separate software (such as firmware or a hardware-assisted debugger) may be executed in high-privilege mode. SMM support logic and/or memory 105 may be entered via a system management interrupt (SMI) which may be caused by hardware, such as the motherboard hardware or chipset signaling via a designated pin, SMI#, of the processor chip, or by software, such as SMI triggered by the system software via an input/output access to a location recognized by the motherboard logic. The SMM support logic and/or memory 105 may be according to certain known SMM support logic and/or memory 105 techniques or new SMM techniques or a similar type of mode. A non-volatile memory, such as non-volatile RAM (NVRAM) 120, may be coupled to a PCH 114 through a controller 116. In some embodiments, NVRAM 120 includes Fast Flash, while controller 116 includes a NAND controller. In some embodiments, controller 116 may be an embedded processor. As an example, hard drive 122 is shown as coupled to PCH 114 and holds an operating system, programs, and data for processor 102. It is contemplated that embodiments are not limited to the hard drive 122 being coupled to PCH 114 and that the hard drive 122 is merely one example of many such devices that can be employed and used. Further, in one embodiment, the conventional S3 entrance is transformed into a novel S3P entrance by, for example, preserving any CPU context at a local memory, such as RAM 107 and once the CPU context is safely stored at the RAM 107, the system 100 is powered down in the S3P state.

In some embodiments, some of the contents of the hard drive 122 can be used by other components of the system. NVRAM 120 has quite a bit less storage capacity than hard drive 122, but has a quicker access than hard drive 122. Accordingly, NVRAM 120 may be referred to as a smaller non-volatile memory, and hard drive 122 may be referred to as a larger non-volatile memory. As with other components illustrated here, it is contemplated that embodiments of the invention are not limited to NVRAM 120 and that they are capable of adopting and adapting to new technological advances. BIOS 124 may provide system BIOS instructions. A wake up circuit 126 may be powered during suspension or hibernation to allow resume. In some embodiments, the components of computing system 100 are held in a case 128, such as with a mobile computing device (e.g., a smartphone, a personal digital assistant (PDA), a tablet computer, a laptop computer, etc.).

It is contemplated that a power state change command (such as a "standby" command, also called "suspend to RAM" or S3 command or S3P command; or fast hibernate command in other embodiments) can be initiated in different ways depending on the embodiments and the configuration of the embodiments. Examples of ways in which a power state change command can be initiated, such as in case of a mobile computing device, include one or more of the following: closing a lid, pressing a power button, pressing another button, making cursor control clicks of a pull down menu or icon, or other ways. A wake event (e.g., resume command) to cause the system to resume from suspension can be initiated in various ways as well depending on the embodiments and the configuration of the embodiments. Examples of ways in which a resume command can be initiated include one or more of the following: opening a lid, pressing a power button, pressing another button, making cursor control clicks, or other ways.

Power management ("PM") unit 118 may include ACPI block registers held by PCH 114; while in other embodiments, ACPI registers may not be used. Software ACPI tables may be held in DRAM. For example, system BIOS can be platform and chipset specific firmware and pass platform and chipset specific information through the APCI tables (in DRAM). ACPI registers may include a register called sleep type (e.g., SLP_TYPE) register and a sleep enable (e.g., SLP_EN) register. For example, a 01 in the sleep type register may indicate suspend and a 02 in the sleep type register may indicate hibernate. When a user selects suspend, the operating system (OS) looks up the ACPI table and sees that suspend means that bits 01 are written into sleep type register. The OS programs that value in the sleep type register. When the OS is ready to go into suspend, it sets the sleep enable bit(s). After the OS sets that sleep enable bit, hardware may take over and PCH 114 powers down the platform as described below. In one embodiment, S3P may be support native by the OS or transparence by the BIOS support. As a result of OS access into SLP_EN bit, the SMI is generated and the SMI flow may include the sequence to enter into S3P mode. Further, for example, a user may select to enter into S3, but the system configuration, based on embodiments of the invention, may support the user request as S3P.

Processor 102 may include an embedded processor (EP), such as embedded processor 116, that could be an existing Manageability Engine (ME) in the chipset or any other processing engine (including high privilege modes of the host CPU) in the platform that has access to physical DRAM and some non-volatile memory, such as Flash. EP 116 may run its code from either flash or physical memory and its execution is independent of the processor cores or host platform state. This allows EP 116 to perform out-of-band manageability functions for the platform when the host cores are not executing. With regard to NVRAM 120, its size may depend on the size of platform boot strap code and any other information that may need to be stored while the platform is not powered. EP 116 may also use NVRAM to store its code and data. NVRAM 120 may be used to store data in addition to the system context.

Figure 2A:
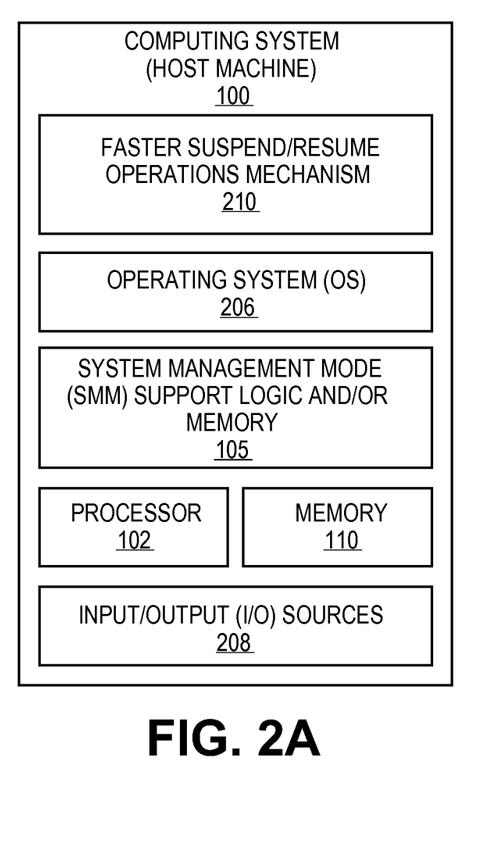
FIG. 2A illustrates a computing system serving as a host machine for employing a mechanism for facilitating faster suspend/resume operations according to one embodiment of the invention.

FIG. 2A illustrates a computing system 100 serving as a host machine for employing a mechanism for facilitating faster suspend/resume operations 210 according to one embodiment of the invention. Computing system 100 (may be the same as computing system 500 of FIG. 5) serves as a host machine employing a mechanism for facilitating faster suspend/resume operations ("faster operations mechanism") 210. Computing system 100 and include mobile computing devices, such as cellular phones including smartphones (e.g., iPhone®, BlackBerry®, etc.), other phones (e.g., landlines), handheld computing devices, personal digital assistants (PDAs), etc., tablet computers (e.g., iPad®, Samsung® Galaxy Tab®, etc.), laptop computers (e.g., notebook, netbook, Ultrabook™, etc.), e-readers (e.g., Kindle®, Nook®, etc.), etc. Computing device 200 may further include set-top boxes (e.g., Internet-based cable television set-top boxes, etc.), and larger computing devices, such as desktop computers, server computers, etc.

Computing system 100 includes an operating system 206 serving as an interface between any hardware or physical resources of the computer system 200 and a user. Computing system 100 further includes one or more processors 102, memory devices 110, SMM support logic and/or memory 105, network devices, drivers, or the like, as well as input/output (I/O) sources 208, such as touchscreens, touch panels, touch pads, virtual or regular keyboards, virtual or regular mice, etc. It is to be noted that terms like "computing device", "node", "computing node", "client", "memory client", "host", "server", "memory server", "machine", "device", "computing device", "computer", "computing system", and the like, are used interchangeably and synonymously throughout this document.

Figure 2B:
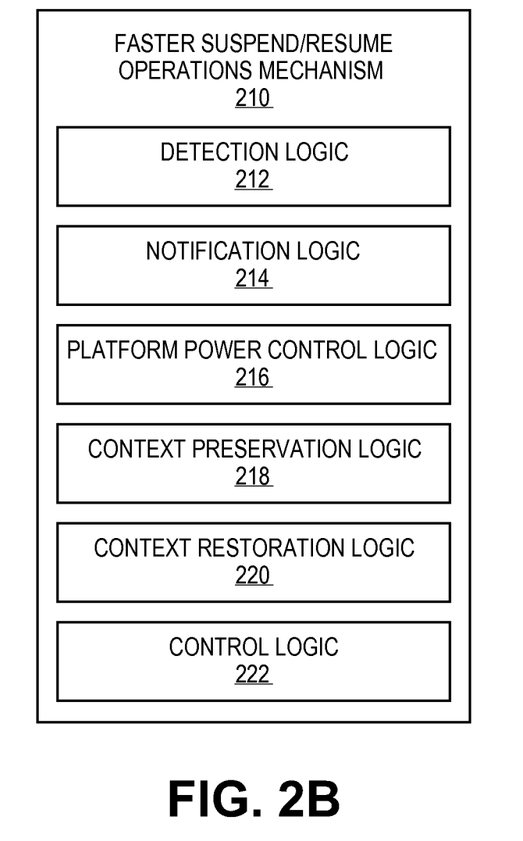
FIG. 2B illustrates an embodiment of a mechanism for facilitating faster suspend/resume operations at computing systems.

FIG. 2B illustrates an embodiment of a mechanism for facilitating faster suspend/resume operations 210 at computing systems. In one embodiment, faster suspend/resume operations mechanism 210 includes a number of components (also referred to as "logic" or "modules"), such as detection logic 212, notification logic 214, platform power control logic 216, context preservation logic 218, context restoration logic 220, and control logic 222.

It is contemplated that a system sleep state may be triggered due to any number of reasons or events, such as a user request or an extended inactivity, etc. Upon triggering of the sleep state, control logic 222 receives control from software (e.g., operating system) which then leads to detection logic 212 detecting the sleep state, such as the S3 state. S3P is enabled in which case a request to enter S3 acts as a suggestion to go to S3P. It is contemplated that under certain conditions (e.g., a failure of some sort), the process may enter S3 as the default state (as opposed to entering S3P). Upon detection of S3 entrance, in one embodiment, SP3 entrance is enabled by having context preservation logic 218 preserve CPU context (e.g., processor package's components) at a local memory, such as the RAM. It is to be noted that in one embodiment, the novel S3P is distinguished from the conventional S3 in that all CPU context is lost during entrance into the S3 state, while it is preserved, as described throughout this document, during the S3P state. Once the CPU context is stored, notification logic 214 notifies platform power control logic 216 (and PCH) to power down for the S3P state. Platform power control logic 216 facilitates the power down of most of the processor package power, except the state maintaining voltage (suspend well).

In response to a wake-up event (such a user pressing a keyboard key, etc.), detection logic 210 detects an S3P exit. In one embodiment, the S3P exit begins directly at the RAM that is preserving the CPU context (without having to use the conventional slow BIOS flash). To continue the S3P exit procedure, platform power control logic 216 powers up the CPU socket and indicates an S3P-exit to the CPU. Context restoration logic 220 restores the preserved CPU context and subsequently, control logic 222 returns the control back to the applicable software (e.g., operating system or SMI code) in the "next instruction" with an indication that the S3P state has been exited.

It is contemplated that any number and type of components may be added to and/or removed from faster operations mechanism 210 to facilitate various embodiments of the invention including adding, removing, and/or enhancing certain features. For brevity, clarity, and ease of understanding of faster operations mechanism 210, many of the standard and/or known components, such as those of a computing device, are not shown or discussed here. It is contemplated that embodiments of the invention are not limited to any particular technology, topology, computing system, memory systems, architecture, and/or standard and are dynamic enough to adopt and adapt to any future changes.

Figure 3:
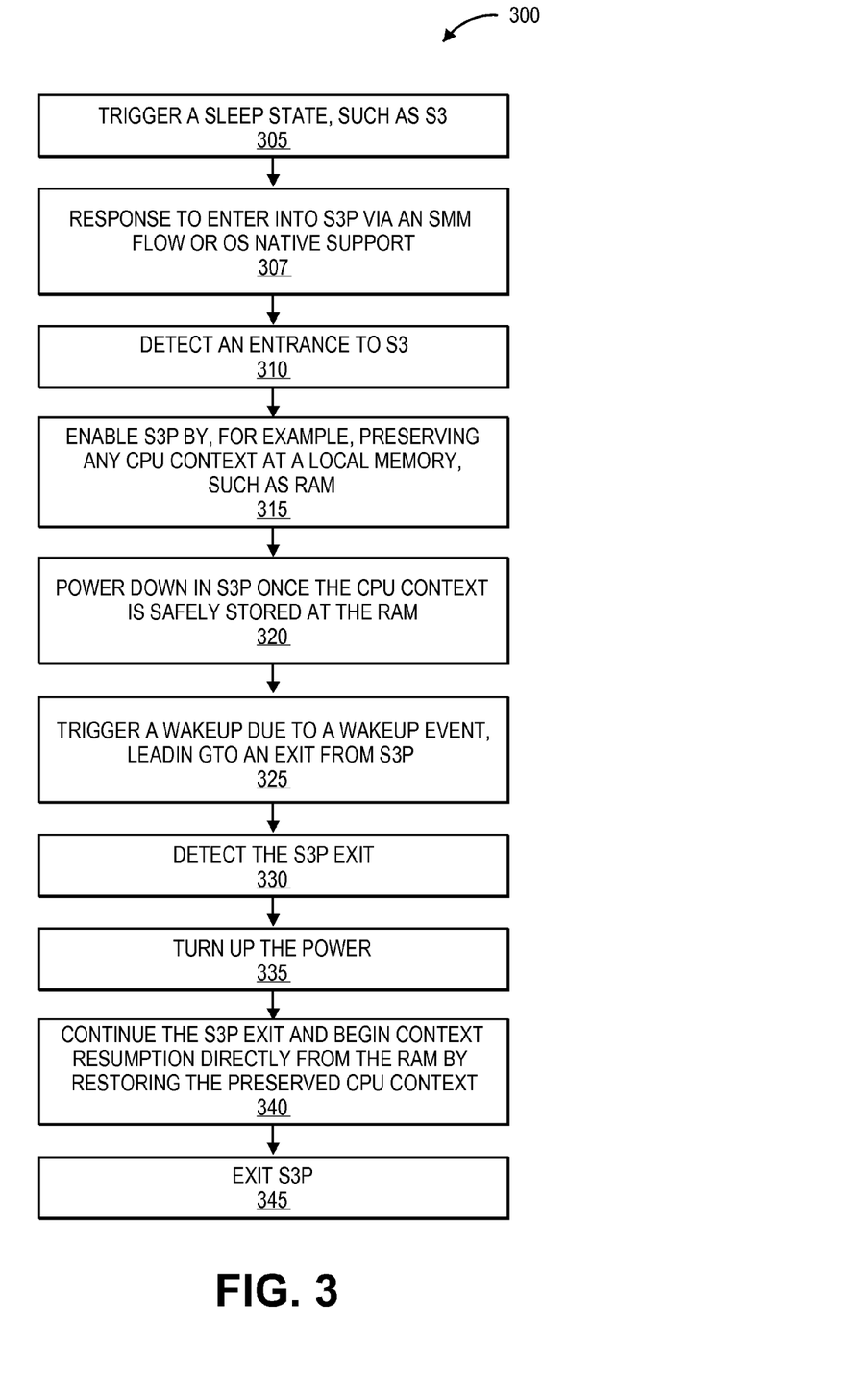
FIG. 3 illustrates a method for facilitating faster suspend/resume operations at computing systems according to one embodiment.

FIG. 3 illustrates a method for facilitating faster suspend/resume operations at computing systems according to one embodiment. Method 300 may be performed by processing logic that may comprise hardware (e.g., circuitry, dedicated logic, programmable logic, etc.), software (such as instructions run on a processing device), or a combination thereof. In one embodiment, method 300 may be performed by faster operations mechanism 210 of FIGS. 2A-2B.

Method 300 begins at block 305 with triggering of a sleep state, such as receiving a request to enter S3P or a request to enter S3 with S3P enabled, and response to enter into S3P by either an SMM flow or OS native support at block 307. At block 310, an entrance to the S3 state is detected. In one embodiment, one or more processes of blocks 305, 307 and 310 may be software-based or performed by software, while one or more processes of the subsequent blocks 315 thru 345 may be hardware-based or performed by hardware or firmware-based or performed by a firmware code support. In one embodiment, the entering into S3P state may occur in cases where the processor consignation is currently set such that S3P is expected, while in those cases where, for example, a hardware extension of the processor (e.g., a hardware enhancement or extension relating to trusted/safe computing, such as Trusted Execution Technology (TXT) by Intel®) or virtualization support is turned on, S3P entering may not occur and the expectation from the S/W in this case might be to enter into legacy S3 state. Additionally, pending events, such as devices' pending interrupts may avoid the option to enter into S3P state. For example, for a pending event, the expectation might be that the S/W will retry or reattempt several times up to a predetermined number of times to enter into S3P. It is after these attempts that the S/W switches into legacy S3. At block 315, in one embodiment, the conventional S3 entrance is transformed into a novel S3P entrance by, for example, preserving any CPU context at a local memory, such as the RAM 107 of FIG. 1. At block 320, once the CPU context is safely stored at the RAM, the system is powered down in the S3P state.

At block 325, a wake up state is triggered by a wake up event which then leads to an exit from the novel S3P state. At block 330, the S3P exit is detected and, at block 335, the power is turned up. At block 335, in one embodiment, the S3P resumption process begins directly from the RAM with the restoration of the preserved CPU context. In one embodiment, the restore may be a hardware restore of the saved state. After this restore, the processor socket state includes one or more of configurations, memory protections, and other state that was saved to RAM in block 325. Further, the indication that the exiting S3P is set may be available for both hardware and software processes. There may be a few differences such as when an S3p exit is indicated, but may relate only to the platform's devices context that may have been lost due to power off of the platform devices. Once the restoration is completed, at block 340, the S3P state is exited and the control is returned back to the operating/running software either in SMI or OS native S3P support flow.

Figure 4A:
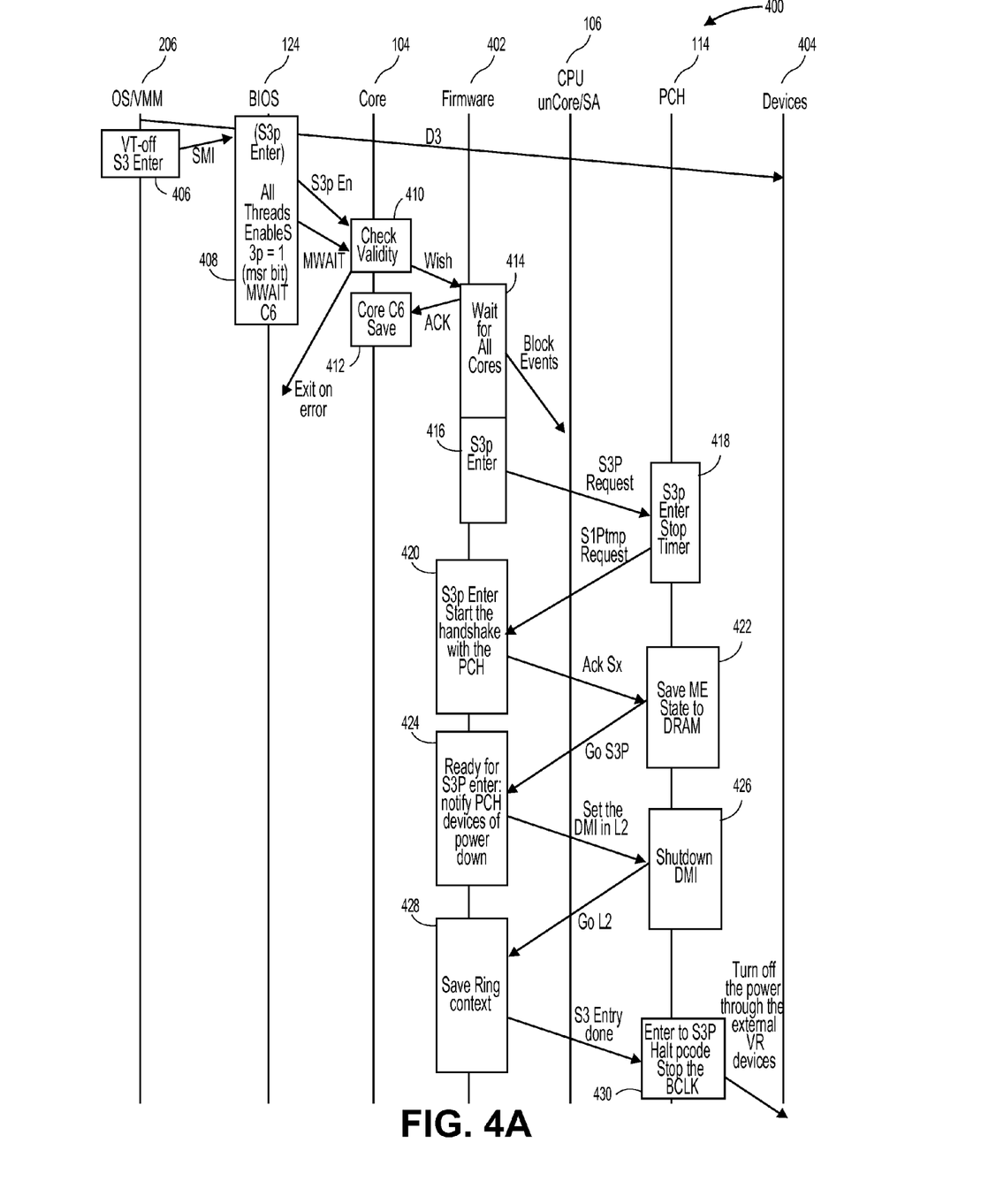
FIG. 4A illustrates a transaction sequence for an S3 Plus entrance according to one embodiment.

FIG. 4A illustrates a transaction sequence 400 for an S3P entrance according to one embodiment. Transaction sequence 400 may be performed by processing logic that may comprise hardware (e.g., circuitry, dedicated logic, programmable logic, etc.), software (such as instructions run on a processing device), or a combination thereof. In one embodiment, method 400 may be performed by faster operations mechanism 210 of FIGS. 2A-2B.

Transaction sequence 400 begins with the initiation of the operating system performing the operations associated with S3 entrance (such operations may include stopping programs execution, stopping devices and saving their state, etc), one step to note is turning off of virtualization if one enabled. When all of these are done, a write operation to the PM_Control register is done, which is trapped by the PCH and by that control is transferred over to system BIOS 124. The transferred to the BIOS may be done by generating an SMI by the PCH as a result of an enter into an SMM mode. It is contemplated that a device state, such as D3, may have been communicated from S/W 206 to various devices 404 (e.g., graphics/display devices, peripheral devices, etc.) so their activities may be disabled and be prepared for possible turn-off, and although the devices 404 may remain responsive to the bus, but they may not initiate any transactions. At this point, in one embodiment. It is contemplated that the devices 404 are entered into the D3 state before the OS enters itself into the S3 state. S3P is enabled and entered 408 and this transformation and is communicated over to a processor core 104 that is then put in MWAIT. Further, in this transaction sequence 400, the MWAIT instruction may be executed in the context of BIOS SMI code. MWAIT refers to an instruction that is causes a wait operation to commence and allows a processor to signal an address on which to wait. At the processor core 104, the processor first verifies that the condition to enter into S3P has been meet and that, in one embodiment, it may not be feasible to enter into S3P, for example, in case where, for example, TXT is enabled for use or virtualization support is currently within the scope of a guest or tuned on. In case where, for example, TXT or virtualization support has been tuned on, the processor may exit out and avoid entering into S3P and thus, the S/W may enter the platform into legacy S3 state. Further, the S/W may have the option to identify this failure from an S3P error report, such as when the S3P enable control bit is cleared by the H/W. Furthermore, the validity of the pending processes (e.g., S3P and MWAIT processes) is checked 410 by the processor and upon completing the checking process, it is communicated through firmware 402 that is associated with a power management controller in the CPU socket.

In one embodiment, certain pending events, such as an I/O event, may nevertheless request to complete their operation and prevent the option to enter into S3P state without losing important information or context. In such cases, a request may be placed to ignore the MWAIT flow entering and return back to S/W 206 with a couple of forms of exits, such as (1) due to a device event, which is regarded as a temporary event, or (2) due to a processor state that may not allow save handling, which is regarded as an error and a corresponding error massage may be issued. In case the MWAIT returns with an failure to enter S3p, it is up to S/W 206 to retry or reattempt several times to enter into the S3P state. In one embodiment, in case of an exit which is not an error (type 1 above) or after a predetermined or a threshold number of retries or (re)attempts the flow or the process may automatically enter into the legacy S3 state, such as when all the MWAITs have returned with an error. The indication that all cores have successfully reached the MWAIT is collected by a central unit, in the illustrated embodiment this is a power management hardware and firmware unit indicated as pCode. However other implementations may include hardware unit only, firmware only, or other distributed mechanisms. Upon receiving an acknowledgement from all relevant cores 414, any context of one or more processing cores is saved 412. This save is done as part of the MWAIT flow. After the processor context is saved (including the cores' threads, the core context, the uncore context, etc.) the S3P stage is entered 416. It is contemplated that a processor is not limited to merely one core and that a computing system may have multiple processors with each processor having multiple cores and their corresponding context, and each core may have its context saved 412 at this stage. Upon putting the core 104 to sleep, a communication is made to processing uncore 106 so that various events may be blocked to prevent any one event from waking up the system. In some embodiments, the blocking of events is done before the saving of the core states but after all cores are stopped.

In one embodiment, an S3P request is communicated from the processing core 402 to a PCH (bypassing processor uncore 106) where it is entered (with a stop timer, such as preparations to go to S3 by the PCH that stops mechanisms that may trigger activity requests (including a wakeup and time-out timers)) 418. An S1Ptmp request is then communicated from the PCH 114 to stop any uncore activity block events (such as forcing a drain of in-flight transactions to their destination (memory)) from acting or executing and as a result, S3P is entered and a handshake is performed 420. An acknowledgment of the S3P entrance and handshake 420 is communicated back to the PCH 114 where an ME state is saved to DRAM 422 and the PCH 114 is notified 424 to power down the devices 404, which is then followed by a shutdown of the PCH main interface (e.g., Direct Media Interface (DMI), etc.) 426 and the internal interconnect state ring context storage 428. In one embodiment, S3P is entered 430, reset signal is asserted, clock is stopped and the power is turned off through external devices. This flow is made to resemble the S3 enter flow from the PCH perspective, other embodiments of this flow may use other sequences at which any state in the PCH that needs to be saved to memory is saved as part of 418 or 422, and the stopping and indication to drain all traffic in flight to memory, close the i/f and save any internal state is done as part of 430 or 434.

Figure 4B:
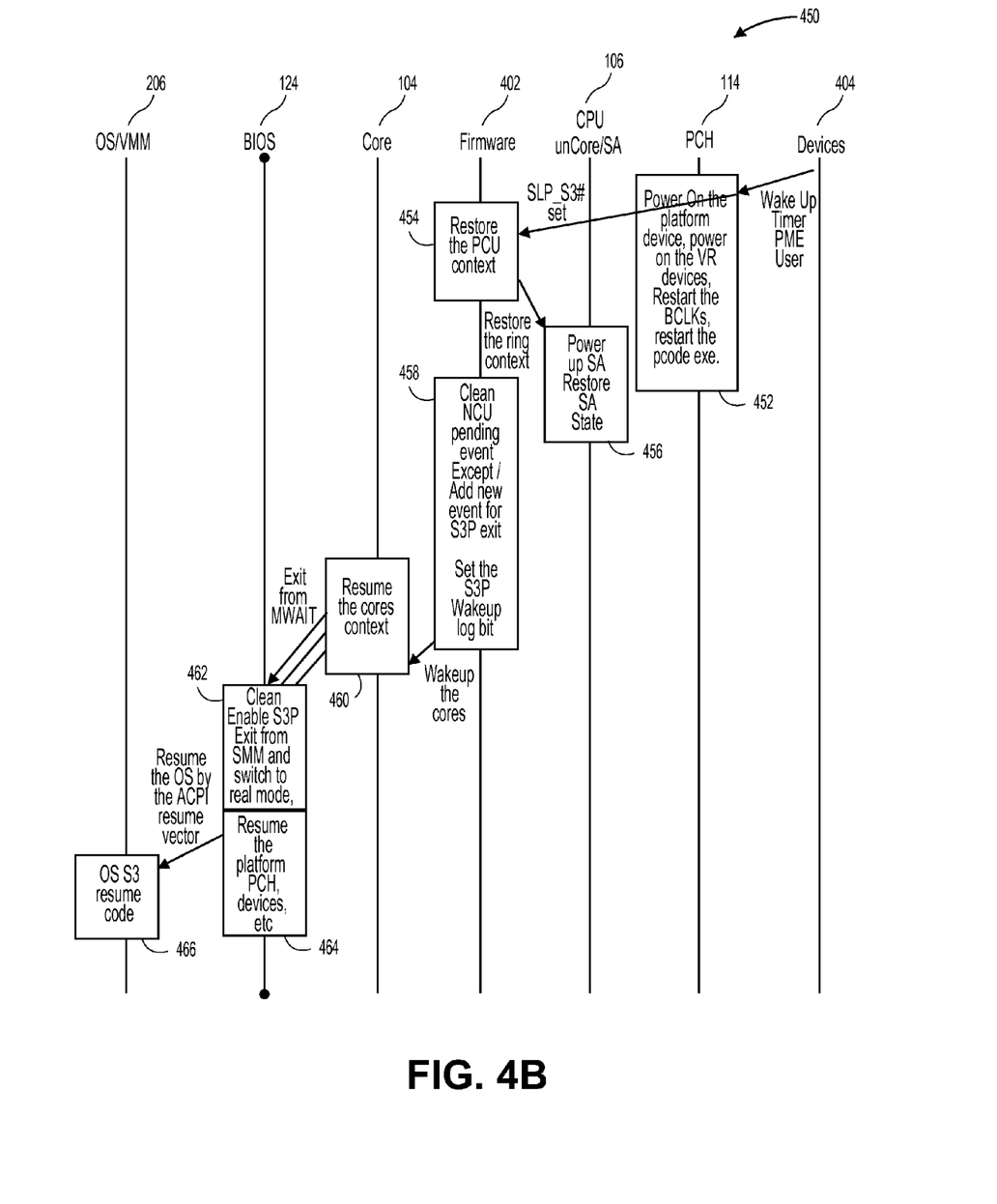
FIG. 4B illustrates a transaction sequence for an S3 Plus exit according to one embodiment.

FIG. 4B illustrates a transaction sequence 450 for an S3P exit according to one embodiment. A wakeup event is triggered from one or more devices 404 (e.g., a user moving a mouse, etc.) and is communicated to PCH 114 where the power is turned on 452 and the one or more devices 404 are exited from D3. With that, an S3P exit is initiated beginning with various processes, such as the restoration of CPU socket context 454 and ring context, powering up of CPU uncore 106, cleaning up of any pending events and adding of new events for S3P exit, such as waking up of CPU cores, as well as setting up the S3P wakeup log bit 458. In one embodiment, as part of the S3P exit, CPU cores 104 are awakened and their preserved context are resumed 480. This leads to an exit from MWAIT that returns back into the SMI flow, and the instruction after the MWAIT further leads to the SMI BIOS 124 (executing from DRAM or SRAM) ending the S3P exit and switching to the conventional BIOS mode 462, and resuming 464 the platform PCH 114, devices 404, etc. Although using embodiments of the invention, most processes relating to S3 operations are skipped, here, the operation is switched from SMI into a regular real mode allowing the BIOS hand over to the OS to resemble the flow used by S3 resume mode, thus allowing operation without changes to the OS. Finally, the operating system 206 is resumed by the ACPI resume vector which leads to the operating system completing the process and resuming the system from S3 466.

Figure 5A:
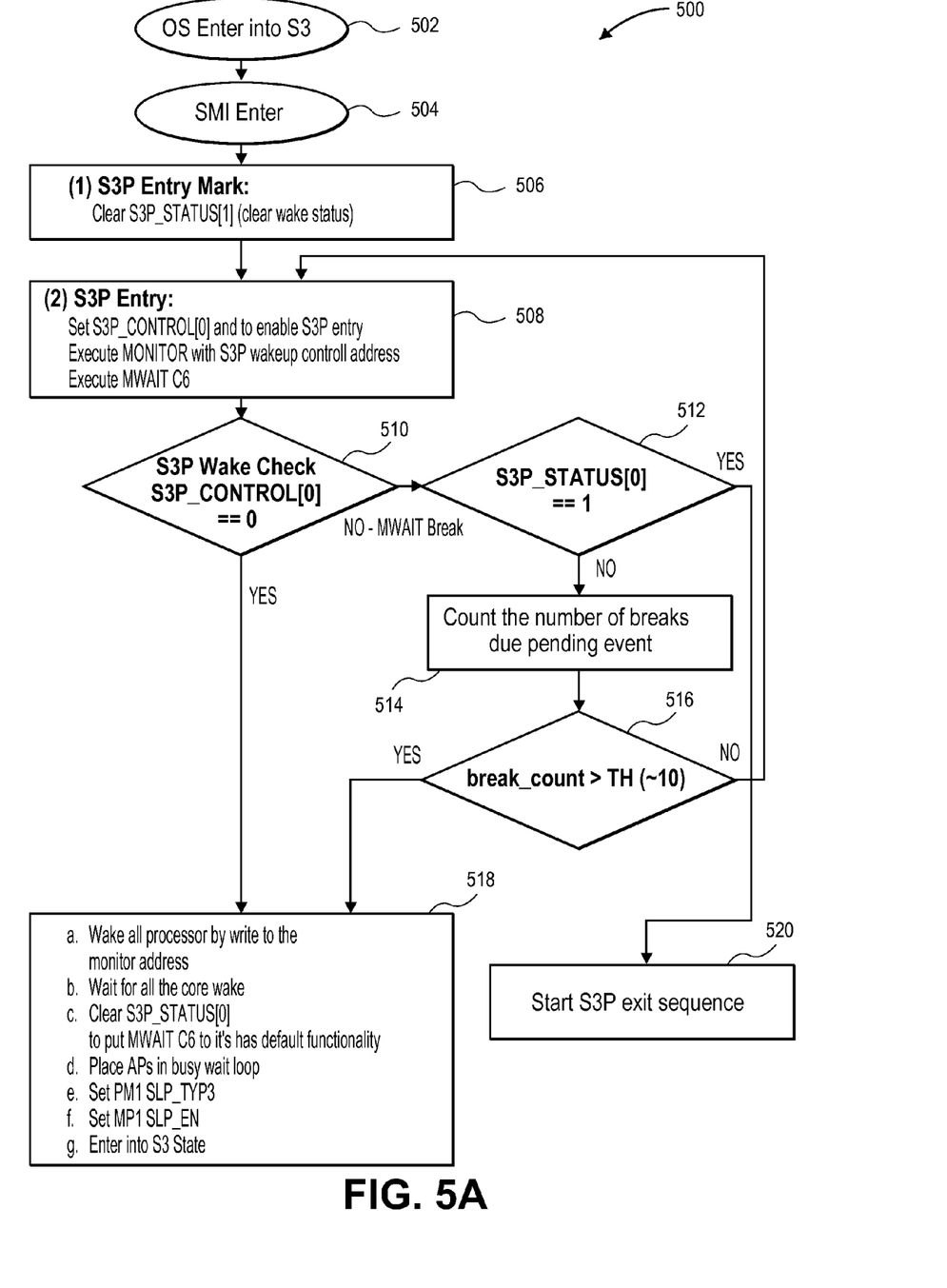
FIG. 5A illustrates a method for S3 Plus entrance checks in Basic Input/Output System according to one embodiment.

FIG. 5A illustrates a method 500 for S3P entrance checks in BIOS according to one embodiment. At block 502, operating system enter S3 by a write into the ACPI SLP_EN register this write is captured by a HW trap and is aborted and triggers an enter to block 504, the SMI handler. If previous S3P was preformed, the S3P entry mark may still be indicating that, thus clearing the S3P entry mark (506) prepares for any new such marking, S3P entry sequence is made at block 508, this is done by setting the a control bit visible to each one of the processors indicating that an MWAIT instruction will be a request to enter S3P, setting a monitor address to one that may be used for cross-waking cores, and then executing the MWAIT instruction on each one of the cores' SMT threads, which will stall execution and will make the core hardware and/or micro code to check the proper condition for sleeping and if met save the core's state. Block 510 is reached by SW when the MWAIT instruction is terminated, the sequence of checks done are used to determine the reason of the wake and properly handle it. At decision block 510, an S3P wake up check is determined and that whether S3P control equals zero. If yes, this is indicative of an error condition during the S3P entry checks, the conventional S3 entry is performed at block 518. If not, at block 512, a determination is made as to whether S3P status equals 1, indicating a successful completion of an S3P entry cycle, allowing (520) which is described in more details in FIG. 5B. If not, this wake occurred due to a possibly spurious event. The counting of the number of breaks due pending event is performed at block 514 and at block 516, a determination is made as to whether a break count is greater than a predefined threshold. If yes, the conventional S3 entry is performed at block 518. If not, the process continues with re-attempting to enter the novel S3P at block 518. Referring back to decision block 512, if the S3P status equals 1, an S3P exit sequence is initiated. In case of the operating system native support for S3P, the OS enter flow may include the same BIOS S3P flow while the main different for OS native support is that block 504 is not included and all the rest of the blocks in FIG. 5A are included in the OS native code and not in the system BIOS SMM code. Native OS support does not request to change the memory operation mode before entering into S3P and it can be done in the OS typical memory usage like protected mode and virtual memory by using paging methodology. It is to be noted that in both S3P support methods (e.g., BIOS or OS native support) that exit from S3P is performed per the instruction after the MWAIT instruction that started the hardware enter sequence into S3P state. The following code after the MWAIT instruction is described in block 510.

In comparison to S3, S3P does not require a re-initialization of the memory controller and that after its resumption from S3P, the memory sub system is available for use right way. For example, the resume flow of S3P may re-initialize any platform devices that were power down during S3P state and whose contexts were not saved and restored as part of the hardware MWAIT enter and exit sequences.

Figure 5B:
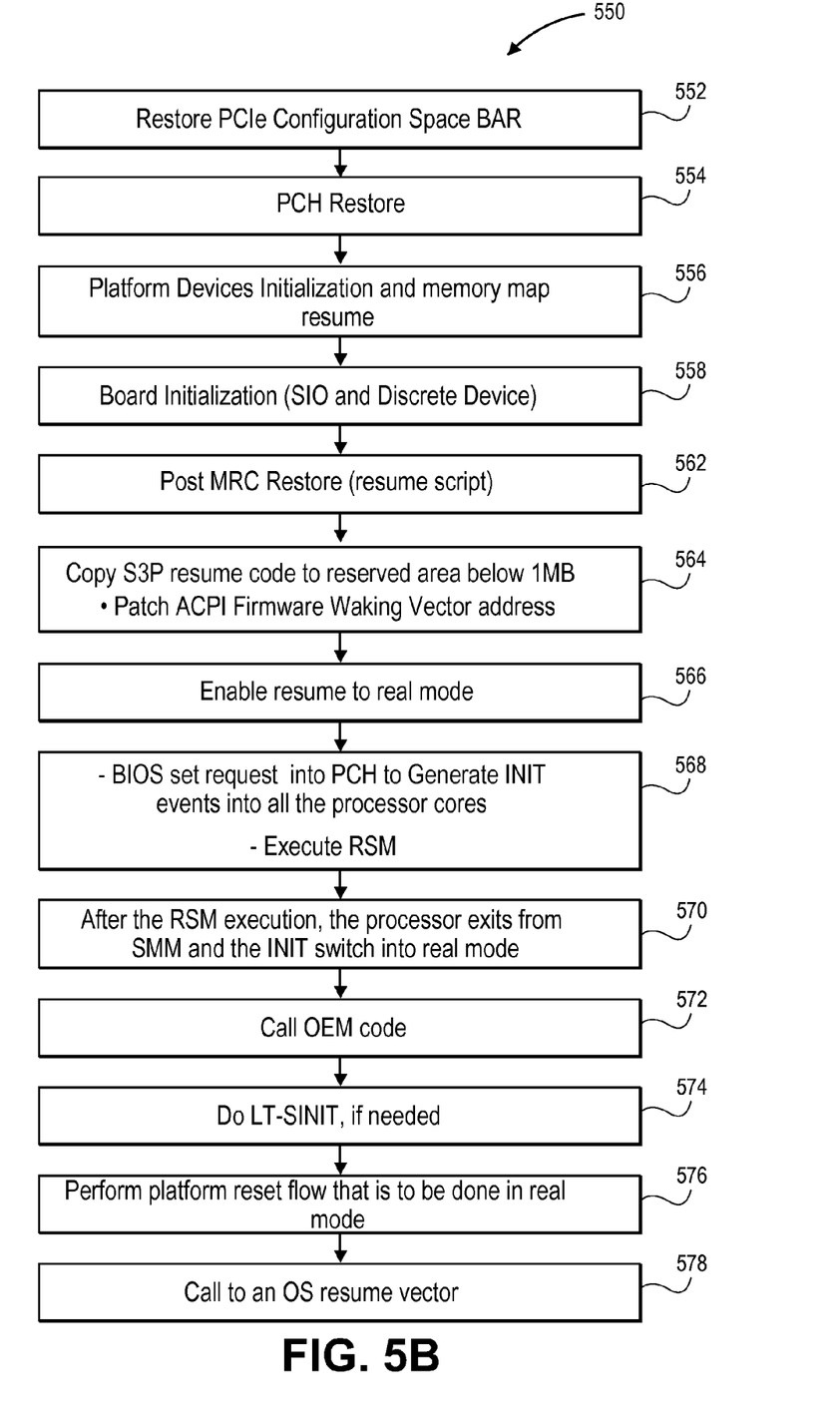
FIG. 5B illustrates a method for S3P exit flow in software according to one embodiment.

FIG. 5B illustrates a method 550 for S3P exit flow in software according to one embodiment. At block 552, Peripheral Component Interconnect Express (PCIe) configuration is restored including all its configuration space and base address register (BAR) are restored. At block 554, PCH setup is restored. At block 556, platform devices are initialized and memory map setting in the PCH configuration is resumed. At block 558, board initialization (including initialization of super I/O (SIO) and discrete devices) is performed. At block 562, post MRC is restored and the script is resumed. At block 564, an S3P resume code is copied to a reserved area (e.g., under 1 MB) and, at block 566, resumption is enabled to real mode. At block 568, BIOS set a request into PCH to generate INIT events into processor cores and further, a resume from SMM (RSM) instruction is executed. At block 570, after the RSM has been executed, the processor exits from SMM and facilitates the INIT switch into the real mode. At block 572, it may enable for the OEM to execute part its BIOS flow that the OEM prefer not to be executed as part of the S3P SMM flow. It can be ether real mode or other mode that the OEM support code can enable from regular real mode. At block 574, in case the TXT is supported by the platform and it is enabled to be in used, LT-SINIT flow is performed and, at block 576, other platform reset flows that is to be done as part of the SMM flow, can be done in this block. It can be either real mode or other mode that the OEM support code can enable from regular real mode. At block 578, an operating system resume vector is called as BIOS may jump to the resume vector that the OS writes to a location known by the BIOS before transferring control to the BIOS. The BIOS typical code to resume the OS is in used, it is up the system BIOS to switch into the right mode of operation as it is defined by the S3 resume method. In order to allowed this option, this innovation enable to switch from SMM into regular exaction mode as part of the resume from S3P.

The platform resume sequence is used as an example and can be done in a different order, such as either as part of the SMI flow or in the BIOS regular flow after the SMI switches into the real mode. In one embodiment, the process of switching into the real mode may happen after the execution of RSM instruction and a switch out by the processor from SMM operation mode. In case of an operation system native support, the resume code may request either the switching into the real mode as is done in the SMI flow (in this case RSM may not be part of this flow) or through the OS resume code to include all the system resumes as it is done by the BIOS. For OS native support code blocks 564, 566, 568, 576 and 578 are not relevant. For this mode the expectation is that real mode will not be in used. The expectation is that native OS support is done in protect mode and while paging methodology and virtual memory is supported by the OS. In native OS support, resume from S3P will return the memory configuration into the same mode as it was in used by the OS before the entering into S3P.

Figure 6:
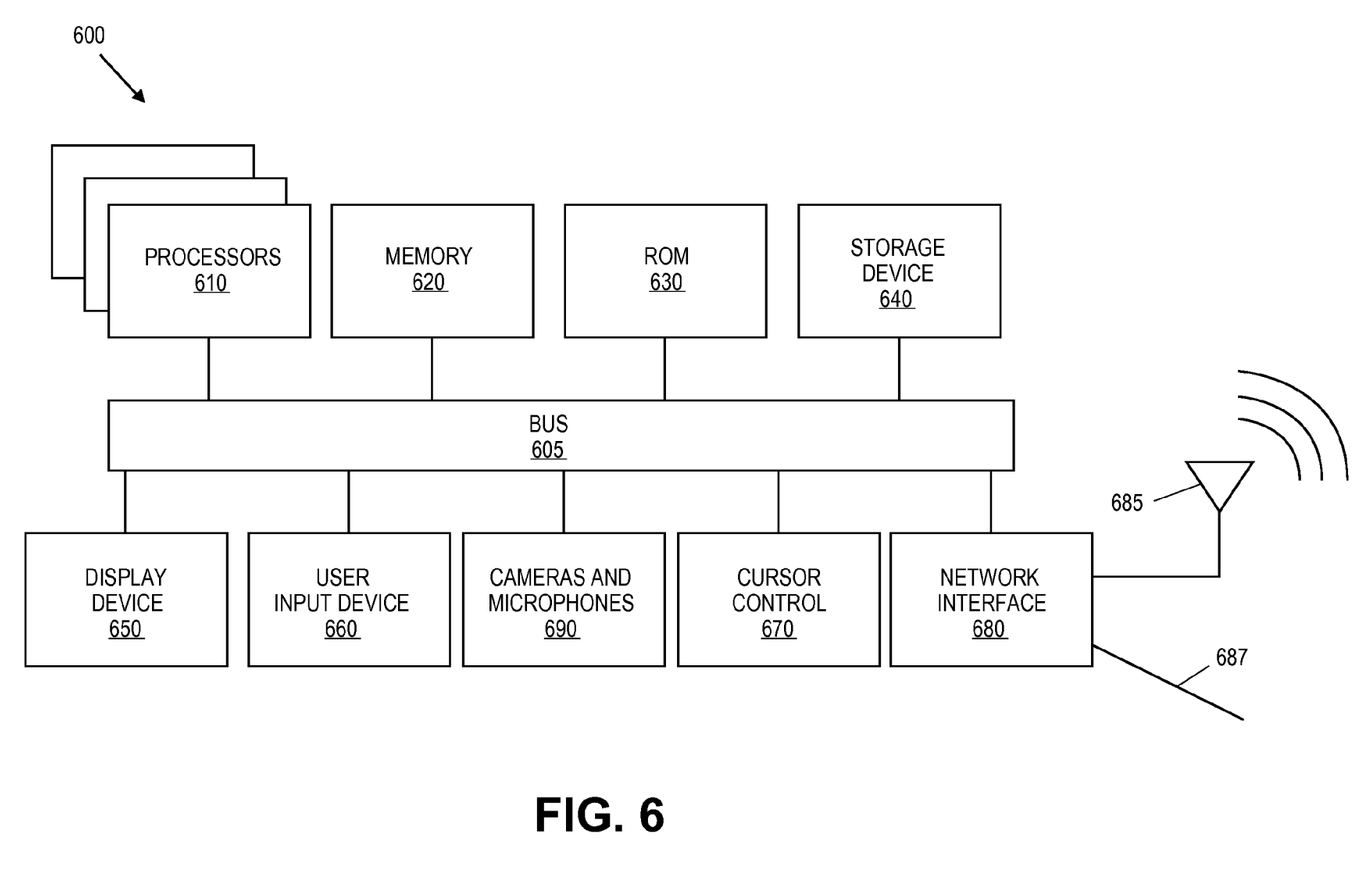
FIG. 6 is block diagram of a computer system suitable for implementing embodiments of the present disclosure according to one embodiment of the invention.

FIG. 6 illustrates an embodiment of a computing system 600. Computing system 600 represents a range of computing and electronic devices (wired or wireless) including, for example, desktop computing systems, laptop computing systems, cellular telephones, personal digital assistants (PDAs) including cellular-enabled PDAs, set top boxes, smartphones, tablets, etc. Alternate computing systems may include more, fewer and/or different components.

Computing system 600 includes bus 605 (or a link, an interconnect, or another type of communication device or interface to communicate information) and processor 610 coupled to bus 605 that may process information. While computing system 600 is illustrated with a single processor, electronic system 600 and may include multiple processors and/or co-processors, such as one or more of central processors, graphics processors, and physics processors, etc. Computing system 600 may further include random access memory (RAM) or other dynamic storage device 620 (referred to as main memory), coupled to bus 605 and may store information and instructions that may be executed by processor 610. Main memory 620 may also be used to store temporary variables or other intermediate information during execution of instructions by processor 610.

Computing system 600 may also include read only memory (ROM) and/or other storage device 630 coupled to bus 605 that may store static information and instructions for processor 610. Date storage device 640 may be coupled to bus 605 to store information and instructions. Date storage device 640, such as magnetic disk or optical disc and corresponding drive may be coupled to computing system 600.

Computing system 600 may also be coupled via bus 605 to display device 650, such as a cathode ray tube (CRT), liquid crystal display (LCD) or Organic Light Emitting Diode (OLED) array, to display information to a user. User input device 660, including alphanumeric and other keys, may be coupled to bus 605 to communicate information and command selections to processor 610. Another type of user input device 660 is cursor control 670, such as a mouse, a trackball, or cursor direction keys to communicate direction information and command selections to processor 610 and to control cursor movement on display 650.

Camera and microphone arrays 690 of computer system 600 may be coupled to bus 605 to observe gestures, record audio and video and to receive and transmit visual and audio commands.

Computing system 600 may further include network interface(s) 680 to provide access to a network, such as a local area network (LAN), wide area network (WAN), metropolitan area network (MAN), personal area network (PAN), Bluetooth, an intranet, the Internet, etc. Network interface(s) 680 may include, for example, a wireless network interface having antenna 685, which may represent one or more antenna (e). Network interface(s) 680 may also include, for example, a wired network interface to communicate with remote devices via network cable 687, which may be, for example, an Ethernet cable, a coaxial cable, a fiber optic cable, a serial cable, or a parallel cable.

Network interface(s) 680 may provide access to a LAN, for example, by conforming to IEEE 802.11b and/or IEEE 802.11g standards, and/or the wireless network interface may provide access to a personal area network, for example, by conforming to Bluetooth standards. Other wireless network interfaces and/or protocols, including previous and subsequent versions of the standards, may also be supported.

In addition to, or instead of, communication via the wireless LAN standards, network interface(s) 680 may provide wireless communication using, for example, Time Division, Multiple Access (TDMA) protocols, Global Systems for Mobile Communications (GSM) protocols, Code Division, Multiple Access (CDMA) protocols, and/or any other type of wireless communications protocols.

Network interface(s) 680 may including one or more communication interfaces, such as a modem, a network interface card, or other well-known interface devices, such as those used for coupling to the Ethernet, token ring, or other types of physical wired or wireless attachments for purposes of providing a communication link to support a LAN or a WAN, for example. In this manner, the computer system may also be coupled to a number of peripheral devices, clients, control surfaces, consoles, or servers via a conventional network infrastructure, including an Intranet or the Internet, for example.

It is to be appreciated that a lesser or more equipped system than the example described above may be preferred for certain implementations. Therefore, the configuration of computing system 600 may vary from implementation to implementation depending upon numerous factors, such as price constraints, performance requirements, technological improvements, or other circumstances. Examples of the electronic device or computer system 600 may include without limitation a mobile device, a personal digital assistant, a mobile computing device, a smartphone, a cellular telephone, a handset, a one-way pager, a two-way pager, a messaging device, a computer, a personal computer (PC), a desktop computer, a laptop computer, a notebook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, television, digital television, set top box, wireless access point, base station, subscriber station, mobile subscriber center, radio network controller, router, hub, gateway, bridge, switch, machine, or combinations thereof.

Embodiments may be implemented as any or a combination of: one or more microchips or integrated circuits interconnected using a parentboard, hardwired logic, software stored by a memory device and executed by a microprocessor, firmware, an application specific integrated circuit (ASIC), and/or a field programmable gate array (FPGA). The term "logic" may include, by way of example, software or hardware and/or combinations of software and hardware.

Embodiments may be provided, for example, as a computer program product which may include one or more machine-readable media having stored thereon machine-executable instructions that, when executed by one or more machines such as a computer, network of computers, or other electronic devices, may result in the one or more machines carrying out operations in accordance with embodiments of the present invention. A machine-readable medium may include, but is not limited to, floppy diskettes, optical disks, CD-ROMs (Compact Disc-Read Only Memories), and magneto-optical disks, ROMs, RAMs, EPROMs (Erasable Programmable Read Only Memories), EEPROMs (Electrically Erasable Programmable Read Only Memories), magnetic or optical cards, flash memory, or other type of media/machine-readable medium suitable for storing machine-executable instructions.

Moreover, embodiments may be downloaded as a computer program product, wherein the program may be transferred from a remote computer (e.g., a server) to a requesting computer (e.g., a client) by way of one or more data signals embodied in and/or modulated by a carrier wave or other propagation medium via a communication link (e.g., a modem and/or network connection). Accordingly, as used herein, a machine-readable medium may, but is not required to, comprise such a carrier wave.

References to "one embodiment", "an embodiment", "example embodiment", "various embodiments", etc., indicate that the embodiment(s) of the invention so described may include particular features, structures, or characteristics, but not every embodiment necessarily includes the particular features, structures, or characteristics. Further, some embodiments may have some, all, or none of the features described for other embodiments.

In the following description and claims, the term "coupled" along with its derivatives, may be used. "Coupled" is used to indicate that two or more elements co-operate or interact with each other, but they may or may not have intervening physical or electrical components between them.

As used in the claims, unless otherwise specified the use of the ordinal adjectives "first", "second", "third", etc., to describe a common element, merely indicate that different instances of like elements are being referred to, and are not intended to imply that the elements so described must be in a given sequence, either temporally, spatially, in ranking, or in any other manner.

The following clauses and/or examples pertain to further embodiments. Specifics in the examples may be used anywhere in one or more embodiments. The various features of the different embodiments may be variously combined with some features included and others excluded to suit a variety of different applications. Some embodiments pertain to a method comprising initiating an entrance process into a first sleep state upon detecting a sleep call at a computing system; transforming from the first sleep state to a second sleep state, wherein transforming includes preserving processor context at a local memory associated with one or more processor cores of a processor at the computing system; and entering the second sleep state.

Embodiments include any of the above methods wherein initiating an exit process from the second sleep state upon detecting a wakeup call; restoring the preserved processor context directly from the local memory; and exiting the second sleep state.

Embodiments include any of the above methods further comprising notifying a platform controller hub (PCH) at the computing system to power down in response to entering the second sleep state.

Embodiments include any of the above methods wherein entering the second sleep state comprises powering down the computing system including the processor except to supply sufficient power to maintain voltage, wherein powering down includes powering down one or more devices coupled to the computing system, wherein the one or more devices include one or more of memory devices and peripheral devices.

Embodiments include any of the above methods wherein initiating the entrance process comprises initiating an S3 sequence at an operating system at the computing system, wherein the first sleep state includes an S3 state.

Embodiments include any of the above methods wherein transforming comprises initiating an S3 plus (S3P) sequence at the operating system following the initiation of the S3 sequence, wherein the S3P sequence is communicated to the one or more processor cores via Basic Input/Output System (BIOS) at the computing system, wherein the second sleep state includes an S3P state.

Embodiments include any of the above methods further comprising notifying the PCH at the computing system to power up in response to exiting the second sleep state.

Embodiments include any of the above methods wherein the local memory comprises a random access memory (RAM) or a dynamic random access memory (DRAM) at the computing system.

In another embodiment, an apparatus comprises: a faster suspend/resume operations mechanism having first logic to initiate an entrance process into a first sleep state upon detecting a sleep call at a computing system; second logic to transform from the first sleep state to a second sleep state, wherein transforming includes preserving processor context at a local memory associated with one or more processor cores of a processor at the computing system; and third logic to enter the second sleep state.

Embodiments include the apparatus above wherein the faster suspend/resume mechanism further comprises: forth logic to initiate an exit process from the second sleep state upon detecting a wakeup call; fifth logic to restore the preserved processor context directly from the local memory; and sixth logic to exit the second sleep state.

Embodiments include the apparatus above wherein the faster suspend/resume mechanism further comprises seventh logic to notify a platform controller hub (PCH) at the computing system to power down in response to entering the second sleep state.

Embodiments include the apparatus above wherein entering the second sleep state comprises powering down the computing system including the processor except to supply sufficient power to maintain voltage, wherein powering down includes powering down one or more devices coupled to the computing system, wherein the one or more devices include one or more of memory devices and peripheral devices.

Embodiments include the apparatus above wherein initiating the entrance process comprises initiating an S3 sequence at an operating system at the computing system, wherein the first sleep state includes an S3 state.

Embodiments include the apparatus above wherein transforming comprises initiating an S3 plus (S3P) sequence at the operating system following the initiation of the S3 sequence, wherein the S3P sequence is communicated to the one or more processor cores via Basic Input/Output System (BIOS) at the computing system, wherein the second sleep state includes an S3P state.

Embodiments include the apparatus above wherein the seventh logic is further to notify the PCH at the computing system to power up in response to exiting the second sleep state.

Embodiments include the apparatus above wherein the local memory comprises a random access memory (RAM) or a dynamic random access memory (DRAM) at the computing system.

In another embodiment, a system comprises: a computing device having a memory to store instructions, and a processing device to execute the instructions, wherein the instructions cause the processing device to initiate an entrance process into a first sleep state upon detecting a sleep call at a computing system; transform from the first sleep state to a second sleep state, wherein transforming includes preserving processor context at a local memory associated with one or more processor cores of a processor at the computing system; and enter the second sleep state.

Embodiments include the system above wherein the processing device is further to: initiate an exit process from the second sleep state upon detecting a wakeup call; restore the preserved processor context directly from the local memory; and exit the second sleep state.

Embodiments include the system above wherein the processing device is further to notify a platform controller hub (PCH) at the computing system to power down in response to entering the second sleep state.

Embodiments include the system above wherein entering the second sleep state comprises powering down the computing system including the processor except to supply sufficient power to maintain voltage, wherein powering down includes powering down one or more devices coupled to the computing system, wherein the one or more devices include one or more of memory devices and peripheral devices.

Embodiments include the system above wherein initiating the entrance process comprises initiating an S3 sequence at an operating system at the computing system, wherein the first sleep state includes an S3 state.

Embodiments include the system above wherein transforming comprises initiating an S3 plus (S3P) sequence at the operating system following the initiation of the S3 sequence, wherein the S3P sequence is communicated to the one or more processor cores via Basic Input/Output System (BIOS) at the computing system, wherein the second sleep state includes an S3P state.

Embodiments include the system above wherein the processing device is further to notify the PCH at the computing system to power up in response to exiting the second sleep state.

Embodiments include the system above wherein the local memory comprises a random access memory (RAM) or a dynamic random access memory (DRAM) at the computing system.

In yet another embodiment, at least one machine-readable comprising a plurality of instructions that in response to being executed on a computing device, causes the computing device to carry out a method according to any one or more of the operations mentioned above.

In another embodiment, an apparatus comprises means for performing any one or more of the operations mentioned above.

In yet another embodiment, a computing device arranged to perform a method according to any one or more of the operations mentioned above.

The drawings and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein. Moreover, the actions any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims.

What is claimed is:

1. A method comprising:
triggering a first sleep state or a second sleep state in at a computing system having a processor, wherein the first sleep state includes a basic sleep state, and wherein the second sleep state includes an advanced sleep state that is optionally enabled or disabled;
entering the first sleep state if the second sleep state is disabled or not expected, wherein the second sleep state is disabled when a hardware extension of the processor does not occur;
entering the second sleep state if the second sleep state is enabled or expected, wherein the second sleep state is enabled when a processor consignation associated with the processor is preset to expect the second sleep state, wherein entering the second sleep state includes transforming the first sleep state into the second sleep state by preserving at least a portion of processor context at a local memory associated with one or more processor cores of the processor at the computing system, wherein the local memory includes an integrated memory;
initiating an exit process from the first sleep state or the second sleep state in response to a wakeup call; and
restoring the preserved processor context from the local memory upon exiting the second sleep state, wherein restoring includes triggering a resume process directly from the local memory to resume the preserved processor context without having to rebuild the processor context or perform conventional Basic Input Output System (BIOS)-related suspend or resume processes.

2. The method of claim 1, further comprising:
exiting the second sleep state, wherein the portion of the processor context includes encryption and protection keys relating to information, wherein the basic sleep state includes a standby/sleep, suspend (S3) state, and wherein the advanced sleep state includes a plus standby/sleep, suspend (S3 Plus) state.

3. The method of claim 1, further comprising notifying a platform controller at the computing system to enter a reduced power state for entering the second sleep state, wherein entering the reduced power state includes powering down one or more devices coupled to the computing system, wherein the one or more devices include one or more of memory devices or peripheral devices.

4. The method of claim 3, further comprising notifying the platform controller at the computing system to enter an increased power state to exit the second sleep state, wherein entering the increased power state includes powering up of the one or more devices, wherein the local memory comprises a random access memory (RAM) or a dynamic random access memory (DRAM) at the computing system.

5. The method of claim 1, wherein restoring of the preserved processor context from the local memory is performed directly from the local memory during a second sleep state-based resume process without having to necessitate a first sleep state-based rebuilding of the processor context.

6. The method of claim 1, wherein the wakeup call is triggered based on one or more of opening a lid, pressing a power button, pressing another button, and clicking of a cursor.

7. The method of claim 1, wherein the second sleep state is further disabled upon occurrence one or more pending events, wherein the one or more pending events include one or more pending interrupts or a predetermined number of failed attempts at entering the first sleep state, wherein the hardware extension of the processor includes a hardware enhancement or extension relating to a trusted/safe computing.

8. An apparatus comprising:
first logic to trigger a first sleep state or a second sleep state at a computing system having a processor, wherein the first sleep state includes a basic sleep state, and wherein the second sleep state includes an advanced sleep state that is optionally enabled or disabled;
second logic to enter the first sleep state if the second sleep state is disabled or not expected, wherein the second sleep state is disabled when a hardware extension of the processor does not occur;
third logic to enter the second sleep state if the second sleep state is enabled or expected, wherein the second sleep state is enabled when a processor consignation associated with the processor is preset to expect the second sleep state, wherein the second logic is further to transform the first sleep state into the second sleep state by preserving at least a portion of processor context at a local memory associated with one or more processor cores of the processor at the computing system, wherein the local memory includes an integrated memory;
fourth logic to initiate an exit process from the first sleep state or the second sleep state in response to a wakeup call; and
fifth logic to restore the preserved processor context from the local memory upon exiting the second sleep state, wherein restoring includes triggering a resume process directly from the local memory to resume the preserved processor context without having to rebuild the processor context or perform conventional Basic Input Output System (BIOS)-related suspend or resume processes.

9. The apparatus of claim 8, wherein the faster suspend/resume mechanism further comprises:
sixth logic to exit the second sleep state, wherein the portion of the processor context includes encryption and protection keys relating to information, wherein the basic sleep state includes a standby/sleep, suspend (S3) state, and wherein the advanced sleep state includes a plus standby/sleep, suspend (S3 Plus) state.

10. The apparatus of claim 8, wherein the faster suspend/resume mechanism further comprises seventh logic to notify a platform controller entering a reduced power state of at the computing system to enter a reduced power state for entering the second sleep state, wherein entering the reduced power state includes powering down one or more devices coupled to the computing system, wherein the one or more devices include one or more of memory devices or peripheral devices.

11. The apparatus of claim 10, wherein the seventh logic is further to notify the platform controller at the computing system to enter an increased power state to exit the second sleep state, wherein entering the increased power state includes powering up of the one or more devices, wherein the local memory comprises a random access memory (RAM) or a dynamic random access memory (DRAM) at the computing system.

12. The apparatus of claim 8, wherein restoring of the preserved processor context from the local memory is performed directly from the local memory during a second sleep state-based resume process without having to necessitate a first sleep state-based rebuilding of the processor context.

13. The apparatus of claim 8, wherein the wakeup call is triggered based on one or more of opening a lid, pressing a power button, pressing another button, and clicking of a cursor.

14. The apparatus of claim 8, wherein the second sleep state is further disabled upon occurrence one or more pending events, wherein the one or more pending events include one or more pending interrupts or a predetermined number of failed attempts at entering the first sleep state, wherein the hardware extension of the processor includes a hardware enhancement or extension relating to a trusted/safe computing.

15. A system comprising:
a computing device having a memory to store instructions, and a processing device to execute the instructions, wherein the instructions cause the processing device to:
trigger a first sleep state or a second sleep state at a computing system having a processor, wherein the first sleep state includes a basic sleep state, and wherein the second sleep state includes an advanced sleep state that is optionally enabled or disabled;
enter the first sleep state if the second sleep state is disabled or not expected, wherein the second sleep state is disabled when a hardware extension of the processor does not occur;
enter the second sleep state if the second sleep state is enabled or expected, wherein the second sleep state is enabled when a processor consignation associated with the processor is preset to expect the second sleep state, wherein the processing device is further to transform the first sleep state into the second sleep state by preserving at least a portion of preserving processor context at a local memory associated with one or more processor cores of the processor at the computing system, wherein the local memory includes an integrated memory;
initiate an exit process from the first sleep state or the second sleep state in response to a wakeup call; and
restore the preserved processor context from the local memory upon exiting the second sleep state, wherein restoring includes triggering a resume process directly from the local memory to resume the preserved processor context without having to rebuild the processor context or perform conventional Basic Input Output System (BIOS)-related suspend or resume processes.

16. The system of claim 15, wherein the processing device is further to:
exit the second sleep state, wherein the portion of the processor context includes encryption and protection keys relating to information, wherein the basic sleep state includes a standby/sleep, suspend (S3) state, and wherein the advanced sleep state includes a plus standby/sleep, suspend (S3 Plus) state.

17. The system of claim 15, wherein the processing device is further to notify a platform controller entering a reduced power state of at the computing system to enter a reduced power state for entering the second sleep state, wherein entering the reduced power state includes powering down one or more devices coupled to the computing system, wherein the one or more devices include one or more of memory devices or peripheral devices.

18. The system of claim 17, wherein the processing device is further to notify the platform controller at the computing device to enter an increased power state at the computing system to exit the second sleep state, wherein entering the increased power state includes powering up of the one or more devices, wherein the local memory comprises a random access memory (RAM) or a dynamic random access memory (DRAM) at the computing system.

19. The system of claim 15, wherein restoring of the preserved processor context from the local memory is performed directly from the local memory during a second sleep state-based resume process without having to necessitate a first sleep state-based rebuilding of the processor context.

20. The system of claim 15, wherein the wakeup call is triggered based on one or more of opening a lid, pressing a power button, pressing another button, and clicking of a cursor.

21. The system of claim 15, wherein the second sleep state is further disabled upon occurrence one or more pending events, wherein the one or more pending events include one or more pending interrupts or a predetermined number of failed attempts at entering the first sleep state, wherein the hardware extension of the processor includes a hardware enhancement or extension relating to a trusted/safe computing.

22. At least one non-transitory machine-readable medium comprising a plurality of instructions that in response to being executed on a computing device, causes the computing device to carry out the following operations:
triggering a first sleep state or a second sleep state at a computing system having a processor, wherein the first sleep state includes a basic sleep state, and wherein the second sleep state includes an advanced sleep state that is optionally enabled or disabled;
entering the first sleep state if the second sleep state is disabled or not expected, wherein the second sleep state is disabled when a hardware extension of the processor does not occur;
entering the second sleep state if the second sleep state is enabled or expected, wherein the second sleep state is enabled when a processor consignation associated with the processor is preset to expect the second sleep state, wherein entering the second sleep state includes transforming the first sleep state into the second sleep state by preserving at least a portion of processor context at a local memory associated with one or more processor cores of the processor at the computing system, wherein the local memory includes an integrated memory;
initiate an exit process from the first sleep state or the second sleep state in response to a wakeup call; and
restore the preserved processor context from the local memory upon exiting the second sleep state, wherein restoring includes triggering a resume process directly from the local memory to resume the preserved processor context without having to rebuild the processor context or perform conventional Basic Input Output System (BIOS)-related suspend or resume processes.

23. The non-transitory machine-readable medium of claim 22, wherein the operations further comprise:
exiting the second sleep state, wherein the portion of the processor context includes encryption and protection keys relating to information, wherein the basic sleep state includes a standby/sleep, suspend (S3) state, and wherein the advanced sleep state includes a plus standby/sleep, suspend (S3 Plus) state.

24. The non-transitory machine-readable medium of claim 22, wherein the operations further comprise notifying a platform controller at the computing system to enter a reduced power for entering the second sleep state, wherein entering the reduced power state includes powering down one or more devices coupled to the computing system, wherein the one or more devices include one or more of memory devices or peripheral devices.

25. The non-transitory machine-readable medium of claim 22, wherein entering the second sleep state comprises entering a reduced power state of the computing system, wherein entering the reduced power state includes powering down one or more devices coupled to the computing system, wherein the one or more devices include one or more of memory devices or peripheral devices,
   wherein the processing device is further to notify the platform controller at the computing device to enter an increased power state at the computing system to exit the second sleep state, wherein entering the increased power state includes powering up of the one or more devices.

26. The non-transitory machine-readable medium of claim 22, wherein restoring of the preserved processor context from the local memory is performed directly from the local memory during a second sleep state-based resume process without having to necessitate a first sleep state-based rebuilding of the processor context.

27. The non-transitory machine-readable medium of claim 22, wherein the wakeup call is triggered based on one or more of opening a lid, pressing a power button, pressing another button, and clicking of a cursor.

28. The non-transitory machine-readable medium of claim 22, wherein the second sleep state is further disabled upon occurrence one or more pending events, wherein the one or more pending events include one or more pending interrupts or a predetermined number of failed attempts at entering the first sleep state, wherein the hardware extension of the processor includes a hardware enhancement or extension relating to a trusted/safe computing.

* * * * *